United States Patent [19]

Kosloff

[11] Patent Number: 5,024,303

[45] Date of Patent: Jun. 18, 1991

[54] HATCHBACK LOCKING DEVICE

[76] Inventor: Ronald S. Kosloff, 15772 Luxenburg, Fraser, Mich. 48026

[21] Appl. No.: 428,919

[22] Filed: Oct. 31, 1989

[51] Int. Cl.$^5$ .............................................. F16F 9/32
[52] U.S. Cl. ........................................ 188/300; 92/18;
  248/354.4; 248/413; 267/64.12; 267/120;
  296/56; 403/106; 403/109; 403/344; 403/362
[58] Field of Search .............. 188/300, 67; 262/64.12;
  262/120; 92/15, 18; 16/66, 84; 403/362, 344,
  106, 109; 296/56; 248/354.3, 354.4, 413

[56] References Cited

U.S. PATENT DOCUMENTS

| 926,426 | 6/1909 | Koch | 403/109 X |
|---|---|---|---|
| 1,543,266 | 6/1925 | Powell | 188/67 |
| 1,661,868 | 3/1928 | Armstrong et al. | 403/362 |
| 2,806,722 | 9/1957 | Atkins | 403/109 X |
| 2,842,387 | 7/1958 | Della-Porta | 248/413 |
| 3,033,599 | 5/1962 | Hudson et al. | 403/362 |
| 3,324,613 | 6/1967 | Duboff | 403/362 X |
| 3,955,828 | 5/1976 | Boudreau | 403/362 X |
| 4,557,470 | 12/1985 | Link | 267/64.12 |
| 4,824,082 | 4/1989 | Schapp | 267/120 |
| 4,865,169 | 9/1989 | Rachels et al. | 267/64.12 X |
| 4,887,673 | 12/1989 | Skoruppa | 188/67 |
| 4,915,538 | 4/1990 | Golden et al. | 403/362 |

FOREIGN PATENT DOCUMENTS

| 821802 | 10/1959 | United Kingdom | 248/354.3 |
|---|---|---|---|
| 2139282 | 11/1984 | United Kingdom | 267/64.12 |

Primary Examiner—George E. A. Halvosa
Attorney, Agent, or Firm—Weintraub, DuRoss & Brady

[57] ABSTRACT

The locking device may either be used with a conventional liftgate support or incorporated into the design of the liftgate support, to retain a hatchback-type door of a vehicle in an open position. The locking device of the present invention is for use with a liftgate support to retain a hatchback-type door in an open position even in cold weather or after the liftgate support has worn out. The liftgate support includes a housing cylinder and an elongated piston rod. The elongated piston rod is slidably positionable relative to the housing cylinder, one end of the elongated piston rod being received within the housing cylinder. The locking device is secured to the housing cylinder by two-sided tape proximate to where the elongated piston rod is received by the housing cylinder. A threaded fastener disposed normally to the longitudinally axis of the elongated piston rod directly engages against the elongated piston rod, thereby precluding the slidable movement of the elongated piston rod relative to the housing cylinder.

4 Claims, 1 Drawing Sheet

U.S. Patent | June 18, 1991 | 5,024,303
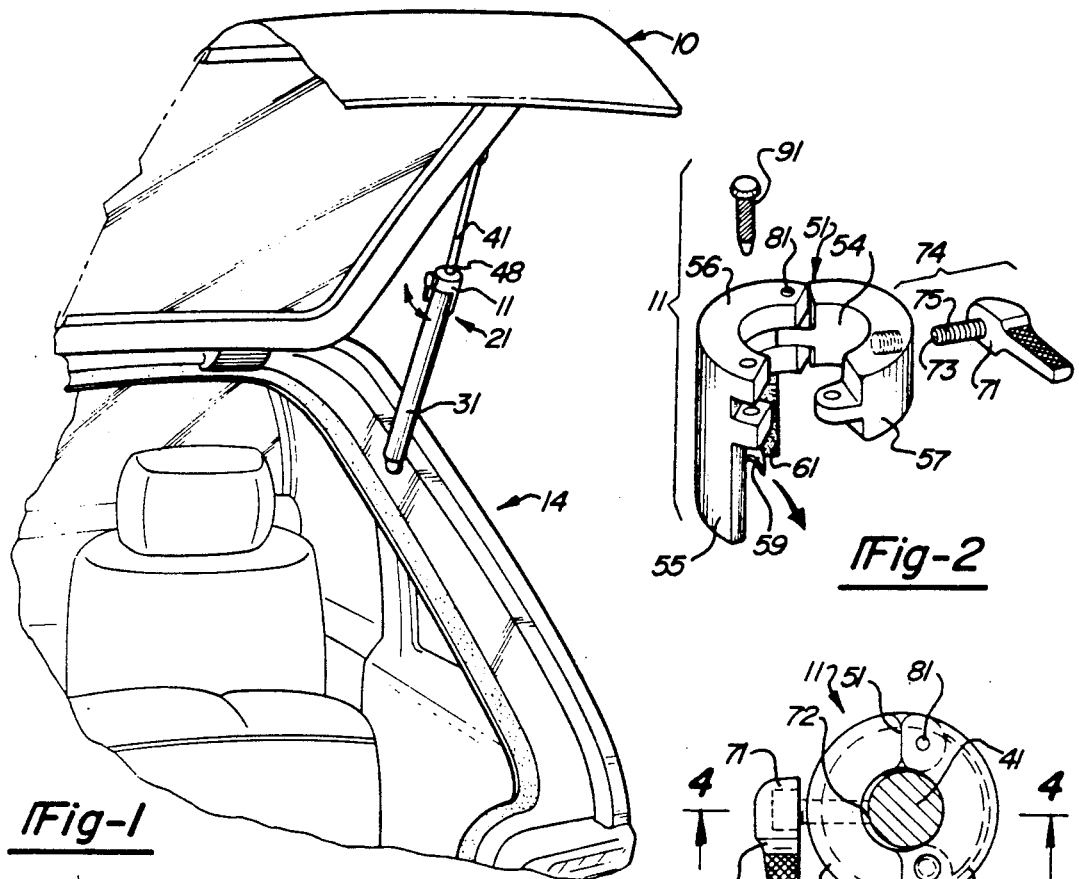
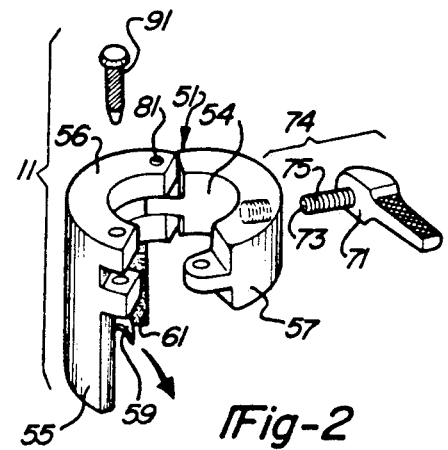
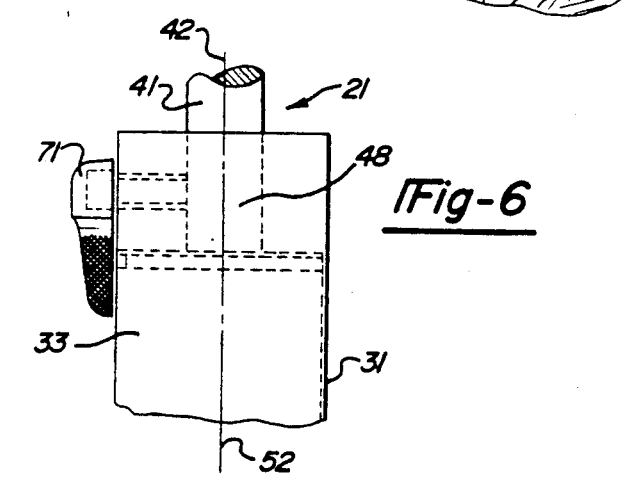
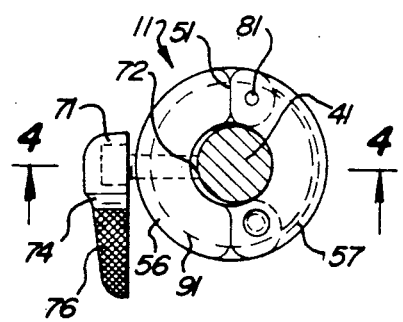
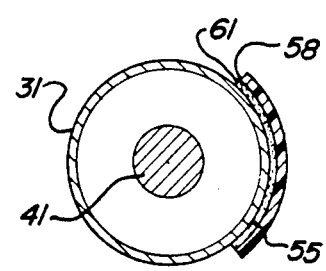
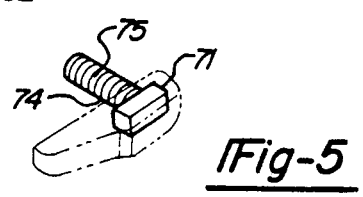

HATCHBACK LOCKING DEVICE

BACKGROUND OF THE INVENTION

1. Field of the Invention

The present invention relates to a locking device for use with the liftgate support of a hatchback on a vehicle, and more particularly, to a locking device which secures the hatchback in the open position, even when the liftgate support is worn-out or in freezing temperatures which may impair the normal operation of the liftgate support.

2. Background Art

Vehicles having a hatchback-type door have become increasingly popular as the consumer trend towards more fuel-effective automobiles continues. Typically, two liftgate supports, one disposed on each side of the hatchback-type door, secure the hatch-back in the raised position. After several years, or during freezing temperatures, these liftgate supports eventually malfunction, which can be a safety hazard to anyone trying to load or unload the back of the vehicle.

U.S. Pat. No. 4,415,194 (Bauer) discloses a vehicular hatchback-type door closure system which is designed to prevent the downward pivotal rotation of the hatchback-type door. A pair of telescoping struts are positioned such that the studs that secure the strut to the hatchback-type door come into a wedging engagement with the strut to limit the clockwise rotation of the hatchback-type door.

U.S. Pat. No. 2,671,355 (Hawkins) discloses a device to retain a vehicle hood or trunk in a raised position. The device includes two members engaged in a telescoping relationship. The holding device includes a first tubular member that slidably receives a rod together with a coiled spring urged locking dog. The locking dog engages the rod with respect to the tubular member, so as to retain the hood or the trunk raised by a predetermined amount.

U.S. Pat. No. Des. 296,866 (Behring) discloses a lockable sleeve that slips onto the elongated piston rod of the liftgate support to secure the shock in the raised position. The lockable sleeve must then be removed from the liftgate support to lower the hatchback-type door. The sleeve is cumbersome to use and store, and can easily damage the liftgate support or the hatchback-type door.

The Polyon Manufacturing Company has developed a spring loaded brace for after-market installation that automatically retains a liftgate support of a hatchback-type door in an open position. The brace is expensive and detracts from the appearance of the vehicle when the hatchback-type door is opened.

What is needed is a locking device that overcomes all of the disadvantages of the prior art, and can either be incorporated into the design of the liftgate support or installed as an after-market lock that is fitted onto one of the liftgate supports, the locking device being universally adapted to virtually any type of liftgate support for a hatchback-type door.

SUMMARY OF THE INVENTION

The locking device of the present invention is for use with a liftgate support to retain a hatchback-type door in an open position even in cold weather or after the liftgate support has worn out. Conventional liftgate supports include both a housing cylinder and an elongated piston rod. The elongated piston rod is slidably positioned relative to the housing cylinder along the longitudinal axis of the elongated piston rod. One end of the elongated piston rod is received within the housing cylinder.

The locking device comprises a body member, means for securing the body member onto the housing cylinder, and a locking member. Preferably, the body member is secured to the housing cylinder by two-sided tape. When the locking device is in the locked position, the locking member is directly engaged against the elongated piston rod, thereby precluding the slidable movement of the elongated piston rod relative to the housing cylinder.

The body member has an aperture disposed therethrough. When the locking member is in the unlocked position, the elongated piston rod is slidably movable through the aperture relative to the housing cylinder.

A threaded fastener is preferably used to vary the shape of the aperture, the threaded fastener being disposed normally to the longitudinal axis of the body member. The locking device further comprises a hinge, which enables the locking device to open to fit around the liftgate support, and a fastening means which attaches the two portions of the body member securely together around the liftgate support.

For a more complete understanding of the hatchback locking device of the present invention, reference is made to the following detailed description and accompanying drawings in which the presently preferred embodiments of the invention are illustrated by way of example. As the invention may be embodied in several forms without departing from the spirit or essential characteristics thereof, it is expressly understood that the drawings are for purposes of illustration and description only, and are not intended as a definition of the limits of the invention. Throughout the following description and drawings, identical reference numbers refer to the same component throughout the several views.

BRIEF DESCRIPTION OF THE DRAWINGS

FIG. 1 is an environmental plan view depicting the preferred embodiment of the locking device of the present invention mounted onto a housing cylinder of a liftgate support, the liftgate support being secured to a hatchback-type door of a passenger vehicle;

FIG. 2 is an elongated plan view of the locking device of FIG. 1, the body member being depicted in the open position enabling the locking device to be installed about the housing cylinder and an elongated piston rod;

FIG. 3 is an enlarged top perspective view of the locking device of FIG. 2, the body member being shown in the closed position;

FIG. 4 is an enlarged top cross-sectional view depicting the locking device of FIG. 3 being secured onto the housing cylinder by the two-sided tape;

FIG. 5 is a detail view of the fastener of FIG. 2, the remainder of the locking device being shown in phantom; and FIG. 6 is an enlarged side view of the locking device of the present invention incorporated into the design of a liftgate support.

DETAILED DESCRIPTION OF THE INVENTION

Referring now to the drawings, FIG. 1 depicts the preferred embodiment of the locking device 11 of the present invention mounted onto a liftgate support 21. The liftgate support 21 is secured to a hatchback-type door 10 of a passenger vehicle 14. The liftgate support 21 includes a housing cylinder 31 and an elongated piston rod 41. The elongated piston rod 41 is slidably positionable relative to the housing cylinder 31 along the longitudinal axis of the elongated piston rod 41. One end of the housing cylinder 31 is attachable to the vehicle 14, and one end of the elongated piston rod 41 is attachable to the hatchback-type door 10. One end 48 of the elongated piston rod 41 is received within the housing cylinder 31.

As shown in FIG. 2, the locking device 11 comprises a body member 51 of toroidal shape, means 61 for securing the body member 51 onto the housing cylinder 31, and a locking member 71. The locking member 71 in the locked position is directly engageable against the elongated piston rod 41, thereby precluding the slidable movement of the elongated piston rod 41 relative to the housing cylinder 31. The bearing surface 73 of the locking member 71 bears directly against the elongated piston rod 41, and the elongated piston rod 41 in turn bears against the body member 51 when the locking device 11 is in the locked position (see FIG. 3).

The locking device 11 is preferably secured to the housing cylinder 31 proximate to where the elongated piston rod 41 is received by the housing cylinder 31. Preferably, the longitudinal axis 52 of the body member 51 is coaxial with the longitudinal axis 42 of the elongated piston rod 41 in the unlocked position.

The body member 51 comprises a first portion 56 and a second portion 57. The first portion comprises a first end and a second end, each of which is a female end, and each having an aperture 81 disposed therethrough. The second portion comprises a first end and a second end, each of which is a male end, and each having an aperture 81 disposed therethrough. A fastening means 91 such as a hinge pin is inserted through the apertures 81 of female ends of the first portion and the apertures 81 of the male ends of the second portion to attach the first and second portions. The body member further comprises a flange 55 extending along the longitudinal axis of the body member. In the preferred embodiment, the flange 55 is attached to the first portion 56 of the body member. Means, such as a two-sided tape 61, for securing the body member 51 to the housing cylinder 31 is disposed on the flange 55, proximate to where the elongated piston rod 41 is received by the housing cylinder 31, as shown in FIG. 2 at 59 has an aperture 54 disposed therethrough. When the locking device 11 is in the unlocked position, the elongated piston rod 41 is slidably movable through the aperture 54 relative to the housing cylinder 31.

The locking device 11 preferably includes a means 72 for varying the shape of the aperture 54 (see FIG. 3). The varying means 72 is preferably a threaded fastener 74, the locking member 71, disposed normally to the longitudinal axis 52 of the body member 51. The threaded portion 75 of the threaded fastener 74 is preferably made of soft brass or plastic to prevent damage the elongated piston rod 31. The elongated piston rod 41 is preferably case hardened, to prevent damage thereto by continual direct engagement by the backing member 71. The finger portion 76 of the threaded fastener 74 is injection molded ABS plastic (see FIG. 5).

After the rear of the vehicle 14 has been loaded or unloaded, the locking member 71 is released by manipulation from direct engagement against the elongated piston rod 41. This preferably occurs by rotating the locking member 71 in a second direction about 180°, the second direction being opposite to the first direction. This unlocking of the locking device 11 enables the slidable movement of the elongated piston rod 41 relative to the housing cylinder 31.

Finally, the hatchback-type door 10 is lowered into the closed position, as the elongated piston rod 41 is moved into the retracted position relative to the housing cylinder 31.

Alternatively, the principles of the present invention may be readily incorporated into a liftgate support 21, as shown in FIG. 6, to extend the life thereof. The housing cylinder 31 contains a fluid medium 33. The elongated piston rod 41 is slidably positionable in a longitudinal manner relative to the housing cylinder 31. A first end 48 of the elongated piston rod 41 is receivable within the housing cylinder 31, and the movement of the elongated piston rod 41 towards the housing cylinder 31 compresses the fluid medium in the housing cylinder 31.

While the hatchback locking device 11 of the present invention has been described in conjunction with specific embodiments, it is evident that many alternatives, modifications, and variations will be apparent to those skilled in the art in light of the disclosure herein. It is intended that the metes and bounds of the invention be determined by the appended claims rather than by the language of the above specification, and that all such alternatives, modifications, and variations which form a functional or conjointly cooperative equivalent are intended to be included within the spirit and scope of these claims.

I claim:

1. A locking device for retaining a liftgate support of a hatchback-type door for a vehicle in an open position, the liftgate support including a housing cylinder and an elongated piston rod, the elongated piston rod being slidably positionable relative to the housing cylinder along the longitudinal axis of the elongated piston rod, an end of the elongated piston rod being received within the housing cylinder, the locking device comprising:
    (a) a body member having a longitudinal axis and being generally toroidal in shape, the body member having an aperture formed therethrough through which the elongated piston rod is slidably moveable relative to the housing cylinder, the body member further comprising:
        (1) a first portion having a first and second end, each end comprising a female end having an aperture disposed therethrough,
        (2) a second portion having a first and second end, each end comprising a male end having an aperture formed therethrough, the apertures of each male end being matable with an associated aperture of an associated female end,
    (b) a flange attached to the body member extending along the longitudinal axis of the body member;
    (c) means for securing the body member onto the housing cylinder comprising two sided tape;
    (d) a locking member comprising: a threaded fastener disposed normally to the longitudinal axis of the body member and including a bearing surface, wherein the bearing surface of the threaded fastener bears directly against the elongated piston rod, and the elongated piston rod in turn bears against the body member when the locking member is in a locked position, thereby precluding the slidable movement of the elongated piston rod relative to the housing cylinder; and wherein the longitudinal axis of the body member is coaxial with the elongated axis of the elongated piston rod and the securing means is disposed on the flange proximate to where the elongated piston rod is received by the housing cylinder.

2. A liftgate support for use with a vehicle having a hatchback-type door, the liftgate support comprising:
 (a) a housing cylinder containing a fluid medium therein;
 (b) an elongated piston rod which is slidably positionable in a longitudinal manner relative to the housing cylinder, a first end of the elongated piston rod being receivable within the housing cylinder, the movement of the elongated piston rod towards the housing cylinder compressing the fluid medium in the housing cylinder; and
 (c) means for retaining the position of the piston rod relative to the housing cylinder when the hatchback-type door is in the open position, said retaining means comprising a body member having a longitudinal axis and being generally toroidal in shape, the body members having an aperture formed therethrough through which the elongated piston rod is slidably moveable relative to the housing cylinder, the body member further comprising:
  (1) a first portion having a first and second end, each end comprising a female end having an aperture disposed therethrough,
  (2) a second portion having a first and second end, each end comprising a male end having an aperture formed therethrough, the apertures of each male end being matable with an associated aperture of an associated female end, a flange attached to the body member extending along the longitudinal axis of the body member; means for securing the body member onto the housing cylinder comprising two sided tape; a locking member comprising: a threaded fastener disposed normally to the longitudinal axis of the body member and including a bearing surface wherein the bearing surface of the threaded fastener bears directly against the elongated piston rod, and the elongated piston rod in turn bears against the body member when the locking member is in a locked position, thereby precluding the slidable movement of the elongated piston rod relative to the housing cylinder; and wherein the longitudinal axis of the body member is coaxial with the elongated axis of the elongated piston rod and the securing means is disposed on the flange proximate to where the elongated piston rod is received by the housing cylinder.

3. A method utilizing the locking device of claim 1 for positioning a hatchback-type door relative to a vehicle, the hatchback-type door being mechanically affixed to a liftgate support, the liftgate support including a housing cylinder and an elongated piston rod, the elongated piston rod having a longitudinal axis along which the elongated piston rod is slidably movable relative to the housing cylinder, an end of the elongated piston rod being received within the housing cylinder, the locking device having a locked position and an unlocked position, the method comprising:
 (a) raising the hatchback-type door to an open position, as the elongated piston rod is moved into an extended position relative to the housing cylinder;
 (b) initially affixing the locking device onto the housing cylinder proximate to where the elongated piston rod is received by the housing cylinder;
 (c) positioning the locking device into direct engagement against the elongated piston rod by rotation of the threaded fastener to bear directly against the elongated piston rod, thereby precluding the slidable movement of the elongated piston rod relative to the housing cylinder as the locking device is moved into the locked position;
 (d) releasing the locking device from direct engagement against the elongated piston arm by manipulation of the locking device, thereby enabling the slidable movement of the elongated piston rod relative to the housing cylinder as the locking device is moved into the unlocked position.

4. The method of claim 3, wherein the elongated piston rod is slidably movable relative to the housing cylinder through the aperture of the locking device when the locking device is in the unlocked position.

* * * * *